United States Patent [19]

Nagano

[11] 4,330,137
[45] May 18, 1982

[54] FRONT DERAILLEUR FOR A BICYCLE

[75] Inventor: Masashi Nagano, Sakai, Japan

[73] Assignee: Shimano Industrial Company Limited, Osaka, Japan

[21] Appl. No.: 171,187

[22] Filed: Jul. 22, 1980

[30] Foreign Application Priority Data

Aug. 15, 1979 [JP] Japan .................. 54-112885[U]

[51] Int. Cl.³ .............................................. B62M 9/12
[52] U.S. Cl. ................................................... 280/238
[58] Field of Search ...................... 280/236, 237, 238; 474/80, 81, 82

[56] References Cited

FOREIGN PATENT DOCUMENTS 399473  2/1909  France .................. 280/236
2401824  9/1978  France .................. 280/236

Primary Examiner—Joseph F. Peters, Jr.
Assistant Examiner—Randall A. Schrecengost
Attorney, Agent, or Firm—Stevens, Davis, Miller & Mosher

[57] ABSTRACT

A front derailleur for a bicycle, which comprises a fixing member, two linkage members, and a movable member having a chain guide. The fixing member comprises a connecting portion for fixing the fixing member to a bottom bracket of the bicycle and an extension extending upwardly from the connecting portion, the extension being provided at its upper end with a pivot portion, so that the linkage members are pivoted to the pivot portion upwardly thereof to thereby position the chain guide above with respect to the fixing member.

3 Claims, 3 Drawing Figures

FRONT DERAILLEUR FOR A BICYCLE

FIELD OF THE INVENTION

This invention relates to a front derailleur for a bicycle, and more particularly to a front derailleur for a bicycle, which comprises a fixing member, two linkage members, and a movable member having a chain guide, and is used for switching a drive chain to a desired one of a plurality of sprockets to thereby change the bicycle speed. In addition, the sprockets are fixed to a crank supported to a cylindrical bottom bracket of the bicycle and usually comprise two sprockets comprising a larger diameter sprocket and a smaller diameter one, or they may comprise more than two sprockets.

BACKGROUND OF THE INVENTION

Generally, a front derailleur mounts its fixing member by use of a mounting band on a seat tube fixed to the bottom bracket of the bicycle. The linkage members are supported to the fixing member downwardly with respect thereto and carries at the lower ends the movable member, so that the chain guide is positioned below with respect to the fixing member.

Such a conventional front derailleur, when intended to be mounted on a seat tube having a different outer diameter, needs a mounting band of suitable size for mating with every seat tube, whereby many bands of different size must be prepared and connected to the derailleur. As a result, it is very difficult to handle many kinds of front derailleurs which are fit to various seat tubes.

Furthermore, the mounting band, when attached to the seat tube for mounting the derailleur, does not have its vertical or circumferential position defined with respect to the seat tube, whereby the above position must be settled every time the derailleur is mounted, resulting in complicated mounting work.

On the other hand, when a control wire is pulled to swing the linkage members to move the movable member so that the chain is switched from a smaller diameter sprocket to a larger diameter sprocket, the chain guide, which is positioned below the fixing member, moves radially outwardly, that is, upwardly, with respect to the larger diameter sprocket. Hence, the chain during shifting is pressed onto the lateral side of the larger diameter sprocket causing poor speed change efficiency. When the chain is switched from the larger diameter sprocket to the smaller diameter sprocket, the chain guide moves radially inwardly, that is, downwardly, with respect to the smaller diameter sprocket, so that the chain does not disengage smoothly from the larger diameter sprocket, resulting in difficult of quick speed changing.

SUMMARY OF THE INVENTION

The present invention is designed to overcome the above problems. A main object of the invention is to provide a front derailleur which need not be manufactured in various sizes to mate with every seat tube of a different outer diameter so that a few types of derailleurs are applicable to many kinds of bicycles, and which is easily mountable thereon at an accurate position with respect to the sprockets. Another object of the invention is to provide a front derailleur superior in speed-change efficiency.

The front derailleur of the invention supports the fixing member not to the seat tube but to a bottom bracket fixing the seat tube. The bottom bracket rotatably supports a crank carrying the sprockets and is comparatively unchanged in its position relative to the sprockets even in a bicycle of a different type or size. Hence, the front derailleur, which is mounted on the bottom bracket, is mountable at a fixed position radially with respect to the sprockets, each having a regular diameter. Also, a chain guide at the front derailleur, which is mounted to the bottom bracket by utilizing one lengthwise end face thereof, can be positioned in an accurate angle with respect to the sprockets.

In detail, the front derailleur of the invention is provided at the fixing member with a connecting portion fixed to the bottom bracket, an extension extending upwardly from the connecting portion, and a pivot portion for pivotably supporting two linkage members, so that the fixing member is fixed to the bottom bracket through the connecting portion.

Since the bottom bracket generally is screwed at both lengthwise ends thereof with a pair of bearing members having flanges so that a crank shaft of a crank carrying the sprockets is rotatably supported to the bottom bracket, the fixing member is provided at its connecting portion with a fitting-in bore of a diameter larger than an outer diameter of one bearing member, and smaller than an outer diameter of the bottom bracket, whereby the fixing member can be simply fixed to the bottom bracket by use of one bearing member screwed therewith.

The fixing member of the invention is formed mainly of a plate member and the fitting-in bore is formed thereat. In this instance, a protector is easily incorporated with the fixing member in order to prevent the chain from escaping from the sprockets.

In the present invention, the linkage members are supported to the fixing member upwardly therefrom, and a movable member supported to the linkage members and a chain guide, are positioned above with respect to the fixing member, whereby the chain guide, when the chain is switched from a smaller diameter sprocket to a larger diameter one, moves downwardly and, when the chain is switched from the larger diameter sprocket to the smaller diameter one, moves upwardly, whereby the chain is smoothly disengaged from the larger diameter sprocket, thus improving the speed change efficiency in comparison with the conventional derailleur.

These and other objects and features of the invention will be more apparent from the following description in accordance with the accompanying drawings.

DETAILED DESCRIPTION OF THE INVENTION

Figure 1:
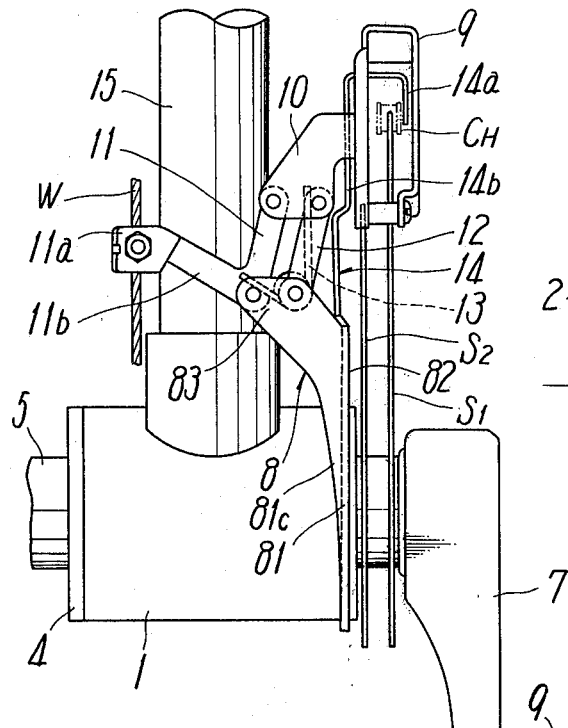
FIG. 1 is a front view of a front derailleur of the invention, which is mounted on a bottom bracket of the bicycle.

In the drawings, reference numeral 1 designates a cylindrical bottom bracket constituting the bicycle frame. The bottom bracket 1 is provided at both end inner peripheries with screw threads 1a and 1b, one screw thread $1a$ being screwed with a bearing member 2 and the other screw thread $1b$ screwed with a bearing member 3 having at its one end a flange $3a$. Bearing member 2 is tightened by a nut 4 screwed onto its outer periphery. Balls 6 are interposed between the bearing members 2 and 3 and a crank shaft 5, thereby supporting the crank shaft 5 rotatably to the bottom bracket 1.

Left and right crank arms 7 are mounted on both axial ends of crank shaft 5 and a larger diameter high speed sprocket $S_1$ and a smaller diameter low speed sprocket $S_2$ are disposed inside the right crank arm 7 and fixed to the crank shaft 5.

The front derailleur of the invention is mounted on the bottom bracket 1 and basically comprises a fixing member 8, a movable member 10 fixedly supporting a chain guide 9, and two linkage members 11 and 12 for supporting the movable member 10 swingably to the fixing member 8.

Figure 2:
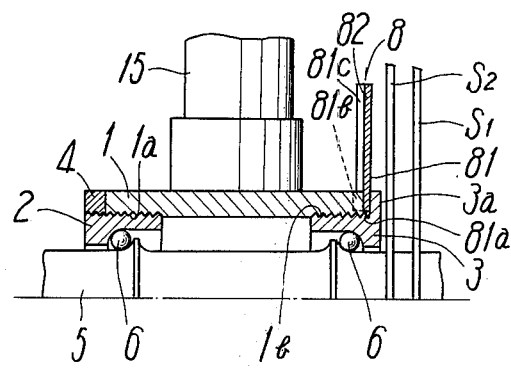
FIG. 2 is a longitudinally sectional view of the front derailleur, showing only a portion mounted on the bottom bracket.
Figure 3:
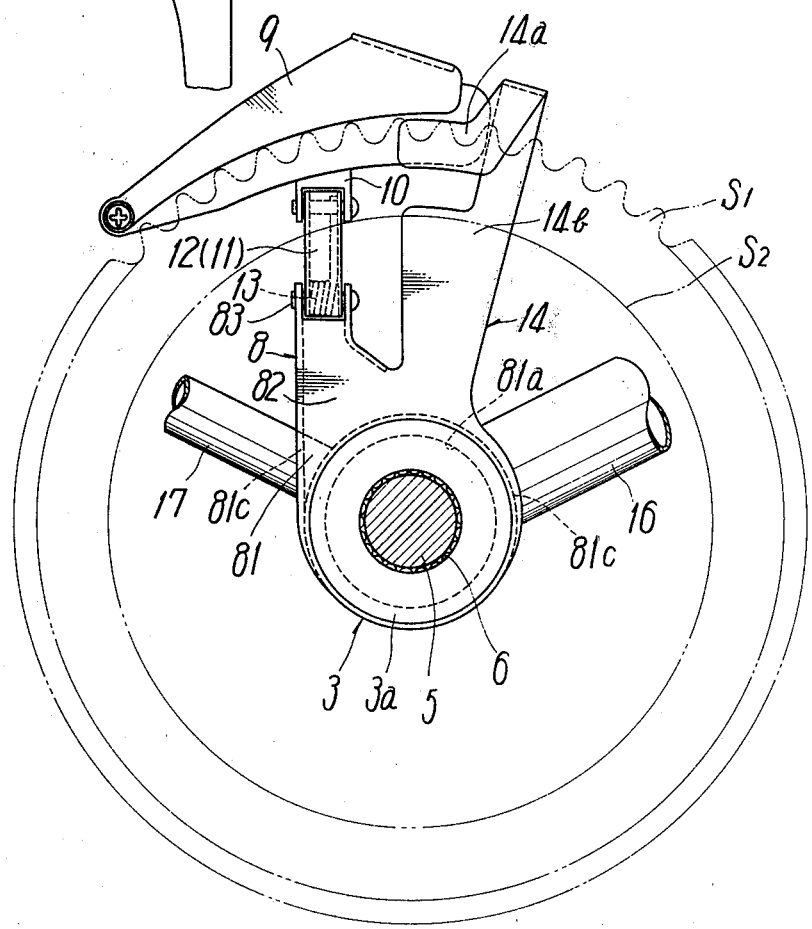
FIG. 3 is a side view of the front derailleur in condition of being mounted on the bottom bracket.

The fixing member 8, as shown in FIGS. 1 through 3, is formed mainly of a metallic plate and comprises a connecting portion 81 for connecting the fixing member 8 with the bottom bracket 1 and an extension 82 extending upwardly from the connecting portion 81, the extension 82 having at its upper end a pivot portion 83 for pivotably supporting therewith the linkage members 11 and 12. At the connecting portion 81 is formed a fitting-in bore $81a$ having a diameter larger than an outer diameter of the bearing member 3 at the right crank arm 7 side and a diameter smaller than an outer diameter of the bottom bracket 1.

The linkage members 11 and 12 are pivoted at one lengthwise ends thereof to the pivot portion 83 at the fixing member 8 and support the movable member at the other ends extending upwardly with respect to the fixing member 8, so that the movable member 10 and chain guide 9 are positioned above with respect to the fixing member 8.

The fixing member 8 is fixed to the bottom bracket 1 in such a manner that the fitting-in bore $81a$ at the connecting portion 81 is fitted onto the bearing member 3 and the bearing member 3 is screwed to fixedly sandwich the connecting portion 81 between the end face of bottom bracket 1 and the flange $3a$ of bearing member 3.

The fixing member 8, which is fixed to the bottom bracket 1, keeps the chain guide 9 in a fixed position and in parallel with respect to the sprockets $S_1$ and $S_2$. In other words, the chain guide 9 is mounted at the prescribed radial position and not inclined with respect to the sprockets $S_1$ and $S_2$.

A return spring 13 is interposed between the fixing member 8 and the movable member 10 and biases the chain guide 9 always toward the larger diameter sprocket $S_1$, and one linkage member 11 has an arm $11b$ integral therewith, the arm $11b$ having a wire fixture $11a$ for securing one end of a control wire W.

The control wire W is pulled to swing the linkage members 11 and 12 counterclockwise so that the movable member 10 and chain guide 9 move leftwards and upwards in FIG. 1 to thereby switch a drive chain CH from the larger diameter sprocket $S_1$ to the smaller diameter sprocket $S_2$. When the control wire W is released, the return spring acts on the movable member 10 so that the movable member 10 and chain guide 9 move rightwards and downwards in FIG. 1 to thereby switch the chain CH from the smaller diameter sprocket $S_2$ to the larger diameter sprocket $S_1$.

Thus, the chain guide 9, which is positioned above with respect to the fixing member 1, moves upwardly toward the smaller diameter sprocket $S_2$ from the larger diameter sprocket $S_1$, so that the chain CH quickly disengage therefrom to thereby perform a smooth speed change. The chain guide 9 moves downwardly from the smaller diameter sprocket $S_2$ to the larger diameter sprocket $S_1$, so that the chain CH is switched to the sprocket $S_1$ without being pressed onto the lateral side thereof. As a result, the front derailleur of the invention improving speed change efficiency.

In the construction according to the foregoing, at least one projection $81b$ is provided at the connecting portion 81 at its one side opposite to the bottom bracket 1 and adjacently to the fitting-in bore $81a$, and an engaging groove is provided at the axially end face of bottom bracket 1 opposite to the connecting portion 81 so that the projection $81b$ engages with the engaging groove, thereby positioning and locking the fixing member 8. The chain guide 9, in turn, is accurately positioned circumferentially with respect to the sprockets $S_1$ and $S_2$.

Also, ribs $81c$, as shown, may be integrally formed at both side edges of connecting portion 81 for its reinforcement. A protector 14 of an inverted L-like shape projects from the connecting portion 81 integrally therewith and its utmost end extends across over the sprockets $S_1$ and $S_2$ and bends toward the sprocket $S_1$ so that the utmost end may be positioned axially outwardly with respect to the sprocket $S_1$ to form a guard $14a$ therefor as shown in FIG. 1. Furthermore, the protector 14 is bent at its intermediate portion toward the smaller diameter sprocket $S_2$ to form a guard $14b$ therefor. Hence, both the guards $14a$ and $14b$ can prevent the chain CH from escaping from the sprockets $S_1$ and $S_2$.

The fixing member 8, alternatively, may be fixed to the bottom bracket 1 by use of fixing means, such as press-fit means, binding means, or use of a ring nut.

In addition, in the drawings, reference numerals 15, 16 and 17 designate a seat tube, front tube and chain stay respectively.

As described above, according to this invention, since the fixing member is mounted on the bottom bracket, there is no need of preparing many kinds of mounting bands as is conventional, resulting in a few types of front derailleurs which are applicable to all types of bicycles.

Furthermore, the mounting portion of the fixing member is pressed against the end face of the bottom bracket, so that the chain guide may be accurately positioned radially and in parallel with respect to the sprockets, thereby simplifying the mounting of the front derailleur. Also, the front derailleur of the invention supports the chain guide above the fixing member, thereby improving the speed change efficiency.

While a preferred embodiment of the invention has been described using specific terms, such description is for illustrative purpose only, and it is to be understood that changes and variations may be made without departing from the spirit or scope of the following claims.

What is claimed is:

1. A front derailleur for a bicycle, which switches a drive chain to a desired one of a plurality of sprockets fixed to a crank supported to a cylindrical bottom bracket of the bicycle and changes the bicycle speed, said front derailleur comprising a fixing member, two linkage members, and a movable member having a chain guide, said fixing member having a plate like connecting portion being fixed to said bottom bracket and an extension extending upwardly from said connecting portion, said extension having at its upper end a pivot portion for pivotally supporting therewith said two linkage members, said pivot portion extending in the axial direction of said bottom bracket and carrying a pair of parallel horizontal pins extending perpendicular to the axial direction of said bottom bracket, each of said linkage members being pivoted at its one lengthwise end to said pivot portion of said fixing member by one of said pins and extending at the other end upwardly with respect to said fixing member, said other end extending upwardly from each of said linkage members to pivotably support said movable member so that said chain guide at said movable member is positioned above said fixing member.

2. A front derailleur for a bicycle according to claim 1, wherein said connecting portion at said fixing member, for connecting said fixing member to said bottom bracket, has a fitting-in bore, said bore having a diameter larger than an outer diameter of a bearing member which has a flange and is screwed with one end of said bottom bracket at the sprocket side, and having a diameter smaller than an outer diameter of said bottom bracket, so that said bearing member screws to said bottom bracket to fix said fixing member to said bottom bracket.

3. A front derailleur for a bicycle according to claim 1, wherein said fixing member has a protector for preventing said chain from escaping from said sprockets.

* * * * *